R. M. GASTON.
DIFFERENTIAL GEAR.
APPLICATION FILED MAY 3, 1919.

1,371,361.

Patented Mar. 15, 1921.
2 SHEETS—SHEET 1.

Inventor:
Ralph M. Gaston,
By Pond & Wilson,
attys.

R. M. GASTON.
DIFFERENTIAL GEAR.
APPLICATION FILED MAY 3, 1919.
1,371,361.
Patented Mar. 15, 1921.
2 SHEETS—SHEET 2.
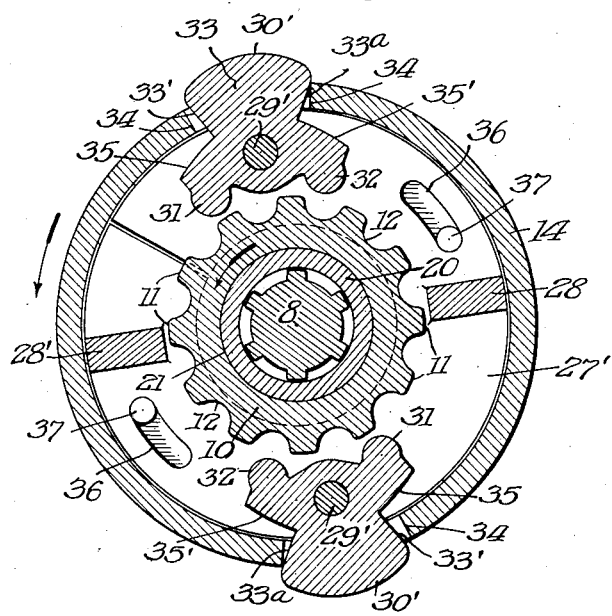
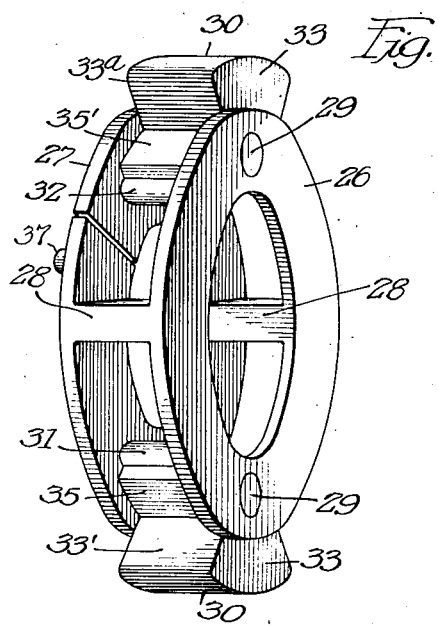
Inventor:
Ralph M. Gaston,
By Pond + Wilson,
attys.

UNITED STATES PATENT OFFICE.

RALPH M. GASTON, OF CHICAGO, ILLINOIS.

DIFFERENTIAL GEAR.

1,371,361.  Specification of Letters Patent.  Patented Mar. 15, 1921.

Application filed May 3, 1919. Serial No. 294,480.

*To all whom it may concern:*

Be it known that I, RALPH M. GASTON, a citizen of the United States, residing at Chicago, in the county of Cook and State of Illinois, have invented certain new and useful Improvements in Differential Gears, of which the following is a specification.

This invention relates to differential gears of that type wherein a pair of alined shaft sections are simultaneously driven from a single transmission with capacity of one section to overrun the other, and wherein, during such overrunning of one shaft section, the power exerted through the transmission is applied to the slower running shaft section. Differential gears of this general type are particularly useful in the power driven axles of motor vehicles, and many different constructions, all based on this broad principle, have heretofore been proposed. However, as compared with the standard differential gear in common use which permits overrunning of one shaft section but does not automatically apply the power to the slower running shaft section during such overrunning, differential gears of the type first above mentioned are unduly complicated, expensive, and unreliable, many of them depending upon the action of springs and other delicate devices to secure the proper coöperation of the parts.

The primary object of the present invention is to provide a differential gear of the type first above mentioned which shall be extremely simple in construction, comprising relatively few parts, economical to build, and entirely reliable and efficient in operation, dispensing with the use of springs and other relatively delicate parts which are liable to become broken or otherwise get out of order.

The differential gear of my present invention is based on the broad principle of a double pawl and ratchet drive housed within and actuated by the rotating drum or casing of the gearing that is driven by the transmission mechanism and automatically allowing overrunning of either shaft section. The principle of the invention, its mode of operation, and its advantages in all situations where a simple and reliable differential gear is required will be readily understood by those skilled in the art from the following detailed description of one practical and workable embodiment of the invention which I have shown in the accompanying drawings, and which illustrates an application of the principle of the invention to a differential gear for driving the twin axle sections of an automobile axle. Referring to the drawings,—

Fig. 3 is a view similar to Fig. 2 but showing the pawls on one side in the idle or neutral position which they occupy when the ratchet-wheel and shaft section driven thereby are overrunning the other ratchet-wheel and shaft section;

Fig. 4 is a perspective elevation of one of the floating annular cages in which the driving pawls are mounted.

Figures 1, 2:
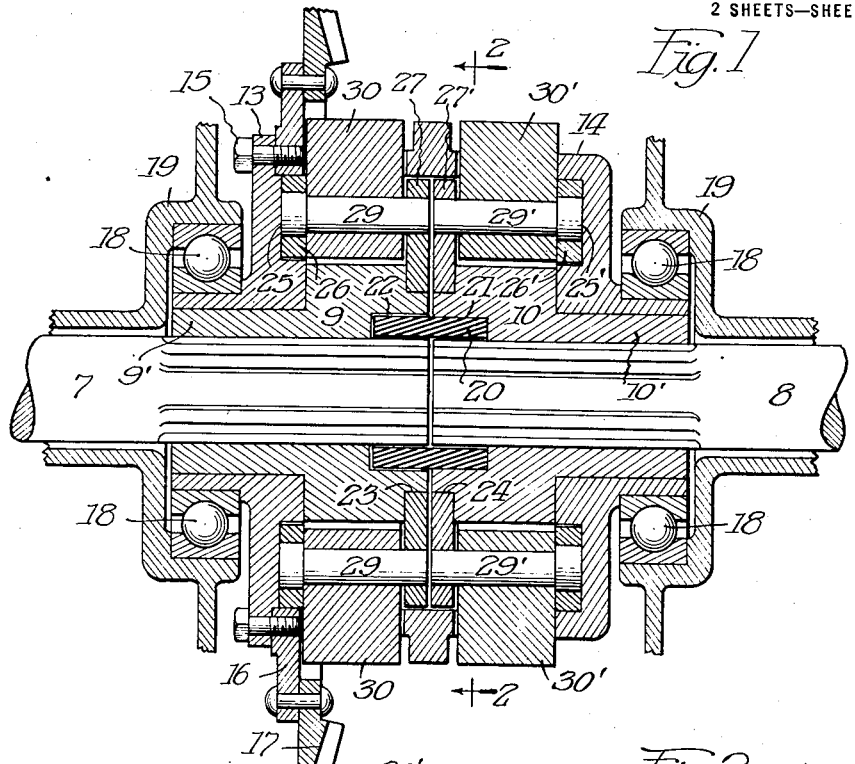
Figure 1 is a full axial longitudinal section through the complete mechanism.
Fig. 2 is a transverse section on the line 2—2 of Fig. 1, showing the pawls in driving relation to the ratchet-wheels.

Referring to the drawings, 7 and 8 designate the twin axle sections of an automobile rear axle structure, splined on the inner or meeting ends of which are double-acting ratchet-wheels 9 and 10, respectively, each of these ratchet-wheels having preferably the peripheral toothed formation illustrated in Figs. 2 and 3, consisting of radial transversely symmetrical flat teeth 11 separated by substantially semi-circular grooves 12; the ratchet-wheel having substantially the form of a cylinder longitudinally fluted at uniform intervals.

The ratchet-wheels 9 and 10 are formed with reduced hubs 9' and 10', on which latter is mounted the rotating housing of the differential, consisting, in the instance shown, of a pair of sections 13 and 14 strongly united by machine screws 15. Bolted or riveted to a radial flange 16 on the housing is the usual bevel gear 17 that is driven by a bevel pinion (not shown) on the rear end of the transmission shaft, as usual and well understood in automobile differentials. The end hubs of the housing are journaled in anti-friction bearings 18 carried by the usual stationary bridge of the axle structure, fragments of which are indicated at 19.

The meeting ends of the rear axle sections 7 and 8 are preferably entered within an alining sleeve or collar 20 which is snugly fitted to a counter-sink 21 in the inner end of one of the ratchet-wheels (as 10) and loosely fits a corresponding counter-sink 22 in the inner end of the opposing ratchet-wheel (as 9). The inner ends of the ratchet-wheels 9 and 10 are also formed with shallow external counter-sinks 23 and 24 for a purpose hereinafter explained.

In the inner face of the housing member 13 is formed an annular groove or channel 25 in which is loosely fitted a ring 26. 27 designates a split or tension ring which has a snug bearing on the counter-sink 23 of the ratchet 9, but is capable of turning, with some drag, on the latter. The two rings are transversely united by a pair of cross-bars 28, thereby forming an annular floating carrier or cage for the pawls, one side of which has a bearing in the housing and the other a bearing on the ratchet-wheel. An identical cage construction is employed in the other end of the housing comprising a ring 26' loosely fitting an annular channel 25' in the housing member 14, a ring 27' snugly fitted to the counter-sink 24 of the ratchet-wheel 10, and connecting bars 28'.

Freely pivoted on pins 29 and 29' carried by these cages are a pair of double-acting pawls 30 and 30' respectively. These pawls are duplicates of each other and each preferably has substantially the form illustrated in Figs. 2 and 3 and including a pair of rounded noses 31 and 32 located at equal radial distances from the pivotal axis of the pawl, and a radial stem or shank 33 that projects into a recess, here shown as an opening, 34 in the circumferential wall of the housing; there being, of course, an opening 34 for each of the pawls. The stem or shank 33 is of considerable width, and its median radial line extended bisects the angle formed by the radii of the noses 31 and 32 of the pawl. It will be observed that the opposite edges 33' and 33ª of the stem of the pawl are not parallel but are disposed at an angle to each other such that one edge will be squarely engaged by the proximate end of the opening 34 of the housing when the pawl is in driving relation to the ratchet, as shown in Fig. 2. The opening 34, however, is of sufficient length to accommodate the maximum width of the stem of the pawl when the latter is in the idle or neutral position, as shown in Fig. 3. It will further be noted that the pawl has, above the noses 31 and 32, extended thrust shoulders 35 and 35' that are formed on short arcs of circles concentric with the inner circumference of the housing, so that when the pawl is in driving position, as shown in Fig. 2, one of these shoulders (as 35') is squarely engaged by the inner circumferential wall of the housing at the same time that the edge 33ª of the stem is squarely engaged by the end wall of the opening 34. By reason of this construction, any rocking or teetering of the pawl in its working position is prevented.

In order to limit relative turning movement of the two floating pawl cages, for a reason hereinafter explained, one of the rings (as 27') is formed with an arcuate slot 36, and the other ring (as 27) is provided with a pin or stud 37 which enters said slot.

In the operation of the mechanism, when both wheels are running forwardly at equal speeds, both pawls are in the position shown in Fig. 2, wherein the rotary thrust of the housing is transmitted directly through the pawls and their noses 31 to the ratchet-wheels, the pawl cages being simply carried around; and the housing, the ratchet-wheels and the cages all turning in the same direction at equal speeds, and consequently without any relative turning movement.

When, now, one wheel overruns the other, such as the outer wheel in turning a corner, the driving ratchet-wheel (as for instance the ratchet-wheel 10) of that wheel runs ahead of the housing. As will be readily understood, this has the effect of simultaneously rocking the pawl on its pivot and advancing the pawl bodily together with its pawl cage to a slight extent limited by the pin and slot connection 37 and 36, between the two cages. The parts are then in the relative positions illustrated in Fig. 3, wherein the entire power of the motor is applied through the other pawl to the slow running axle and wheel, while the faster running axle and wheel are temporarily disconnected from the transmission. The purpose of the pin and slot connection between the two cages is to so limit the extent of movement of the cage carrying the pawl which has been shifted to neutral position as to prevent danger of the pawl being rocked to the opposite driving position through contact of its stem with the left hand end wall of the opening 34, which would at once lock the faster running wheel and axle against moving any faster than the slower running wheel and axle. As soon as the faster running wheel and axle slow down to a speed less than the speed of the opposite wheel and axle, the pawl cage, which partakes of the speed of the ratchet-wheel on which it is mounted, owing to the frictional drag between the two, shifts the pivot of the pawl back to its former position, thereby returning the nose 31 of the pawl into operative driving engagement with the ratchet-wheel.

It will readily be seen that the construction is reversible in direction of movement to drive the axle and wheels backward as well as forward. Assuming that the pawls are in the forward driving position illustrated in Fig. 2, when the housing is reversed as to its direction of drive, the left hand end of the openings 34 strikes the stems of the pawls and rocks the latter over into the opposite driving position relatively to their ratchet-wheels. Differential speeds in traveling backwardly are effected by precisely the same relative behavior of the parts as has been already set forth in describing their behavior at differential speeds in the forward direction.

It will be observed that the entire mechanism comprises extremely few parts, and these of the simplest construction; that no springs whatever are used or are required; and that the mechanism is positive and reliable in its action. So far as I am aware the present invention is broadly new in the employment of a pair of pawls pivoted on floating supports and engaging independent ratchet-wheels, said pawls being thrown into driving engagement with the ratchet-wheels by the rotary movement of the housing, and when so engaged transmitting the thrust direct from the housing to the ratchet-wheel without any strain on the pivot or fulcrum of the pawl. I have herein shown two oppositely disposed pairs of pawls, which affords a well balanced structure, but it is obvious that a greater or less number may be employed. In other detail respects also the described mechanism may be varied without involving any departure from the principle and purview of the invention as defined in the appended claims.

I claim:

1. In a differential gear, the combination of a pair of alined shaft sections, ratchet-wheels on the proximate ends of said shaft sections, a housing mounted to rotate around said ratchet-wheels, a pair of floating pawl carriers in said housing, a pair of pawls pivotally mounted on said pawl-carriers, respectively, each of said pawls being drivingly engaged by the circumferential wall of said housing and in driving relation to one of said ratchet wheels, and means for limiting the extent of relative movement of said pawl-carriers.

2. In a differential gear, the combination of a pair of alined shaft sections, double-acting ratchet wheels on the proximate ends of said shaft sections, a housing mounted to rotate around said ratchet wheels, a pair of floating pawl-carriers in said housing, a pair of double-acting pawls pivotally mounted on said pawl-carriers, respectively, each of said pawls being drivingly engaged by the circumferential wall of said housing when the latter is turning in either direction and in driving relation to one of said ratchet wheels, and means for limiting the extent of relative movement of said pawl-carriers.

3. In a differential gear, the combination of a pair of alined shaft sections, ratchet wheels on the proximate ends of said shaft sections, a housing mounted to rotate around said ratchet wheels, a pair of annular floating pawl cages in said housing co-axial with said ratchet wheels, a pair of pawls pivotally mounted in said cages, respectively, each of said pawls being drivingly engaged by the circumferential wall of said housing and in driving relation to one of said ratchet wheels, and means for limiting the extent of relative movement of said pawl cages.

4. In a differential gear, the combination of a pair of alined shaft sections, double-acting ratchet wheels on the proximate ends of said shaft sections, a housing mounted to rotate around said ratchet wheels, a pair of annular floating pawl cages in said housing co-axial with said ratchet wheels, a pair of double-acting pawls pivotally mounted on said pawl-carriers, respectively, each of said pawls being drivingly engaged by the circumferential wall of said housing when the latter is turned in either direction and in driving relation to one of said ratchet wheels, and means for limiting the extent of relative movement of said pawl cages.

5. In a differential gear, the combination of a pair of alined shaft sections, ratchet wheels on the proximate ends of said shaft sections, a housing mounted to rotate around said ratchet wheels and formed with a recess in its circumferential wall, a pair of floating pawl-carriers in said housing, a pair of pawls pivotally mounted on said pawl-carriers, respectively, each of said pawls having a stem lying within the recess of said housing whereby it may be swung into driving engagement with its ratchet wheel and whereby the rotary movement of said drum is transmitted through said pawl to said ratchet wheel, and means for limiting the extent of relative movement of said pawl-carriers.

6. In a differential gear, the combination of a pair of alined shaft sections, ratchet wheels on the proximate ends of said shaft sections, a housing mounted to rotate around said ratchet wheels and formed with a recess in its circumferential wall, a pair of floating pawl-carriers in said housing, a pair of pawls pivotally mounted on said pawl-carriers, respectively, each of said pawls having a stem lying within the recess of said housing and a shoulder adapted to engage the inner circumferential wall of said housing when said pawl is drivingly engaged with said ratchet wheel, whereby the rotary movement of said drum is transmitted through said pawl to said ratchet wheel, and means for limiting the extent of relative movement of said pawl-carriers.

7. In a differential gear, the combination of a pair of alined shaft sections, double-acting ratchet wheels on the proximate ends of said shaft sections, a housing mounted to rotate around said ratchet wheels and formed with a recess in its circumferential wall, a pair of floating pawl-carriers in said housing, a pair of double-acting pawls pivotally mounted on said pawl-carriers, respectively, each of said pawls having a stem lying within the recess of said housing and a shoulder on each side of said stem adapted to engage the inner circumferential wall of said housing when said pawl is drivingly engaged with said ratchet wheel, whereby the rotary movement of said drum in either direction is transmitted through said pawl to said ratchet wheel, and means for limiting the extent of relative movement of said pawl-carriers.

8. In a differential gear, the combination of a pair of alined shaft sections, ratchet wheels on the proximate ends of said shaft sections, a housing mounted to rotate around said ratchet wheels and formed with a recess in its circumferential wall, a pair of annular floating pawl cages in said housing co-axial with said ratchet wheels, a pair of pawls pivotally mounted in said pawl cages, respectively, each of said pawls having a stem lying within the recess of said housing and a shoulder adapted to engage the inner circumferential wall of said housing when said pawl is drivingly engaged with said ratchet wheel, and means for limiting the extent of relative movement of said pawl cages.

9. In a differential gear, the combination of a pair of alined shaft sections, double-acting ratchet wheels on the proximate ends of said shaft sections, a housing mounted to rotate around said ratchet wheels and formed with a recess in its circumferential wall, a pair of annular floating pawl cages in said housing co-axial with said ratchet wheels, a pair of double-acting pawls pivotally mounted in said pawl cages, respectively, each of said pawls having a stem lying within the recess of said housing and a shoulder on each side of said stem adapted to engage the inner circumferential wall of said housing when said pawl is drivingly engaged with said ratchet wheel, and means for limiting the extent of relative movement of said pawl cages.

RALPH M. GASTON.